United States Patent
Mitsuyama

(10) Patent No.: US 10,942,695 B2
(45) Date of Patent: Mar. 9, 2021

(54) ALTERNATIVE PRINT SYSTEM, PRINT MANAGEMENT SYSTEM INCLUDED THEREIN, AND NON-TRANSITORY COMPUTER-READABLE RECORDING MEDIUM FOR STORING PRINT MANAGEMENT PROGRAM TO DETERMINE ALTERNATIVE IMAGE FORMING DEVICE FOR ALTERNATIVE PRINT

(71) Applicant: KYOCERA Document Solutions Inc., Osaka (JP)

(72) Inventor: Kyota Mitsuyama, Osaka (JP)

(73) Assignee: KYOCERA DOCUMENT SOLUTIONS INC, Osaka (JP)

(*) Notice: Subject to any disclaimer, the term of this patent is extended or adjusted under 35 U.S.C. 154(b) by 0 days.

(21) Appl. No.: 16/809,699

(22) Filed: Mar. 5, 2020

(65) Prior Publication Data
US 2020/0310723 A1    Oct. 1, 2020

(30) Foreign Application Priority Data
Mar. 26, 2019   (JP) .............................. JP2019-059156

(51) Int. Cl.
  G06F 3/12      (2006.01)
(52) U.S. Cl.
  CPC .......... G06F 3/1261 (2013.01); G06F 3/1211 (2013.01); G06F 3/1253 (2013.01)
(58) Field of Classification Search
  CPC ..... G06F 3/1261; G06F 3/1211; G06F 3/1253

USPC ........................................................ 358/1.13
See application file for complete search history.

(56) References Cited

U.S. PATENT DOCUMENTS

| 2002/0163666 | A1* | 11/2002 | Iwata | G06F 3/1207 358/1.15 |
|---|---|---|---|---|
| 2010/0053664 | A1* | 3/2010 | Mandel | G06F 3/124 358/1.15 |
| 2010/0153545 | A1* | 6/2010 | Mizuno | G06F 1/3203 709/224 |
| 2013/0250329 | A1* | 9/2013 | Satoh | G06F 3/126 358/1.13 |

FOREIGN PATENT DOCUMENTS

| JP | 2016-097644 | 5/2016 |
| JP | 2016-218548 | 12/2016 |

* cited by examiner

Primary Examiner — Allen H Nguyen
(74) Attorney, Agent, or Firm — Lex IP Meister, PLLC

(57) ABSTRACT

In an alternative print system, in case where an error making printing impossible occurs when an image forming device receives print data, the image forming device requests an alternative print as printing by an alternative device as an alternative image forming device of the image forming device itself to a print management system. When the alternative print is requested from the image forming device to the print management system, the print management system determines all of image forming devices included in one of the combination of the image forming devices to provide total printing speed equal to or higher than the printing speed of the image forming device that requests the alternative print to the print management system with the minimum number, and transmits the print data for the alternative print to the determined alternative device.

7 Claims, 19 Drawing Sheets

FIG. 5

IMAGE FORMING DEVICE INFORMATION 34C

| DEVICE ID | PRINTING SPEED (SHEET/MINUTE) | INSTALLATION LOCATION | ... |
|---|---|---|---|
| D001 | 40 | ××BUILDING ROOM401 | ... |
| D002 | 30 | ××BUILDING ROOM401 | ... |
| D003 | 20 | ××BUILDING ROOM401 | ... |
| D004 | 120 | ××BUILDING ROOM402 | ... |
| D005 | 60 | ××BUILDING ROOM402 | ... |
| D006 | 20 | ××BUILDING ROOM402 | ... |
| D007 | 30 | ××BUILDING ROOM403 | ... |
| D008 | 20 | ××BUILDING ROOM403 | ... |
| D009 | 60 | ××BUILDING ROOM403 | ... |
| D010 | 150 | ××BUILDING ROOM403 | ... |
| D011 | 60 | ××BUILDING ROOM403 | ... |
| D012 | 70 | ○○BUILDING ROOM101 | ... |
| ... | ... | ... | ... |

FIG. 6

ALTERNATIVE PRINT GROUP INFORMATION 34D

| GROUP ID | DEVICE ID | ... |
|---|---|---|
| G001 | D001 | ... |
| G001 | D002 | ... |
| G001 | D003 | ... |
| G001 | D004 | ... |
| G001 | D005 | ... |
| G001 | D006 | ... |
| G001 | D007 | ... |
| G001 | D008 | ... |
| G001 | D009 | ... |
| G001 | D010 | ... |
| G001 | D011 | ... |
| G002 | D012 | ... |
| ⋮ | ⋮ | ⋮ |

FIG. 9

| DEVICE ID |
|---|
| D001 |
| D002 |
| D003 |
| D004 |
| D005 |
| D006 |
| D007 |
| D008 |
| D009 |
| D010 |

FIG. 15

DEVICE DISTANCE INFORMATION 234C

| DEVICE ID | DISTANCE(m) | ... |
|---|---|---|
| D001 | 8 | ... |
| D002 | 4 | ... |
| D003 | 6 | ... |
| D004 | 12 | ... |
| D005 | 15 | ... |
| D006 | 17 | ... |
| D007 | 22 | ... |
| D008 | 25 | ... |
| D009 | 28 | ... |
| D010 | 25 | ... |
| D011 | 23 | ... |
| ⋮ | ⋮ | ⋮ |

FIG. 18

| DEVICE ID |
|---|
| D001 |
| D002 |
| D003 |

FIG. 19

| DEVICE ID |
|---|
| D001 |
| D002 |
| D003 |
| D004 |
| D005 |
| D006 |

ALTERNATIVE PRINT SYSTEM, PRINT MANAGEMENT SYSTEM INCLUDED THEREIN, AND NON-TRANSITORY COMPUTER-READABLE RECORDING MEDIUM FOR STORING PRINT MANAGEMENT PROGRAM TO DETERMINE ALTERNATIVE IMAGE FORMING DEVICE FOR ALTERNATIVE PRINT

INCORPORATION BY REFERENCE

This application is based upon, and claims the benefit of priority from, corresponding Japanese Patent Application No. 2019-059156 filed in the Japan Patent Office on Mar. 26, 2019, the entire contents of which are incorporated herein by reference.

BACKGROUND

Field of the Invention

The present disclosure relates to an alternative print system, a print management system, and a non-transitory computer-readable recording medium for storing a print management program, each for executing alternative printing as printing by an image forming device, which is alternative to an image forming device in which an error has occurred.

Description of Related Art

As a conventional alternative print system, there has been known an alternative print system that determines an image forming device closest to the image forming device in which an error has occurred as an alternative image forming device which is alternative to the image forming device in which the error has occurred.

SUMMARY

An alternative print system of the present disclosure includes a plurality of image forming devices, and a print management system configured to manage printing by the plurality of image forming devices, in case where an error making printing impossible occurs when print data is received by an image forming device out of the plurality of image forming devices, the image forming device requests to the print management system an alternative print as printing by an alternative device as an alternative image forming device of the image forming device itself, in which the print management system includes an alternative device determination unit configured to determine the alternative device when the alternative print is requested from the image forming device, and an alternative print data transmission unit configured to transmit print data for the alternative print to the alternative device determined by the alternative device determination unit, and the alternative device determination unit determines, as the alternative device, all of the image forming devices included in one of combinations of the image forming devices with the minimum number to provide total printing speed equal or higher than the printing speed of the image forming device which requests the alternative print to the print management system.

A non-transitory computer-readable recording medium executable by a processor in an image forming device of the present disclosure stores a print management program. The print management program causes the processor to operate as an alternative device determination unit configured to determine an alternative device when an alternative print as printing by the alternative device as an alternative image forming device of the image forming device itself is requested from the image forming device, and as an alternative print data transmission unit configured to transmit print data for the alternative print to the alternative device determined by the alternative device determination unit, and the alternative device determination unit determines, as the alternative device, all of the image forming devices included in one of combinations of the image forming devices with the minimum number to provide total printing speed equal or higher than the printing speed of the image forming device which requests the alternative print to the print management system.

BRIEF DESCRIPTION OF THE DRAWINGS

FIG. 5 is a diagram showing an example of image forming device information shown in FIG. 3;

FIG. 6 is a diagram showing an example of alternative print group information shown in FIG. 3;

FIG. 9 is a diagram showing an example of a candidate determination device determined in the operation shown in FIG. 8;

FIG. 15 is a diagram showing an example of device distance information shown in FIG. 14;

FIG. 18 is a diagram showing an example of a candidate determination device determined in the operation shown in FIG. 17; and FIG. 19 is a diagram showing an example of the candidate determination device determined in the operation shown in FIG. 17, which is different from the example shown in FIG. 18.

DETAILED DESCRIPTION

Hereinafter, embodiments of the present disclosure will be described with reference to the drawings.

First Embodiment

First, the configuration of an alternative print system according to a first embodiment of the present disclosure will be described.

Figure 1:
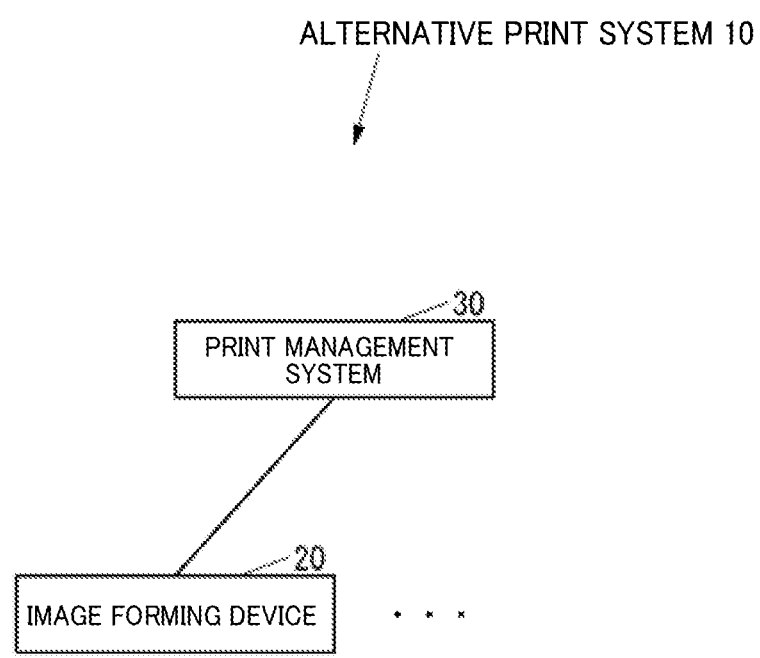
FIG. 1 is a block diagram of an alternative print system according to a first embodiment of the present disclosure.

FIG. 1 is a block diagram of an alternative print system 10 according to the present embodiment.

As shown in FIG. 1, the alternative print system 10 includes an image forming device 20. The image forming device 20 is configured by, for example, a multifunction peripheral (MFP), a dedicated printer, and the like. In addition to the image forming device 20, the alternative print system 10 may include at least one image forming device having the same configuration as that of the image forming device 20.

The alternative print system 10 includes a print management system 30 for managing printing based on the image forming device. The print management system 30 may be configured by one computer or a plurality of computers. The print management system 30 may also be a system that operates on a cloud.

Figure 2:
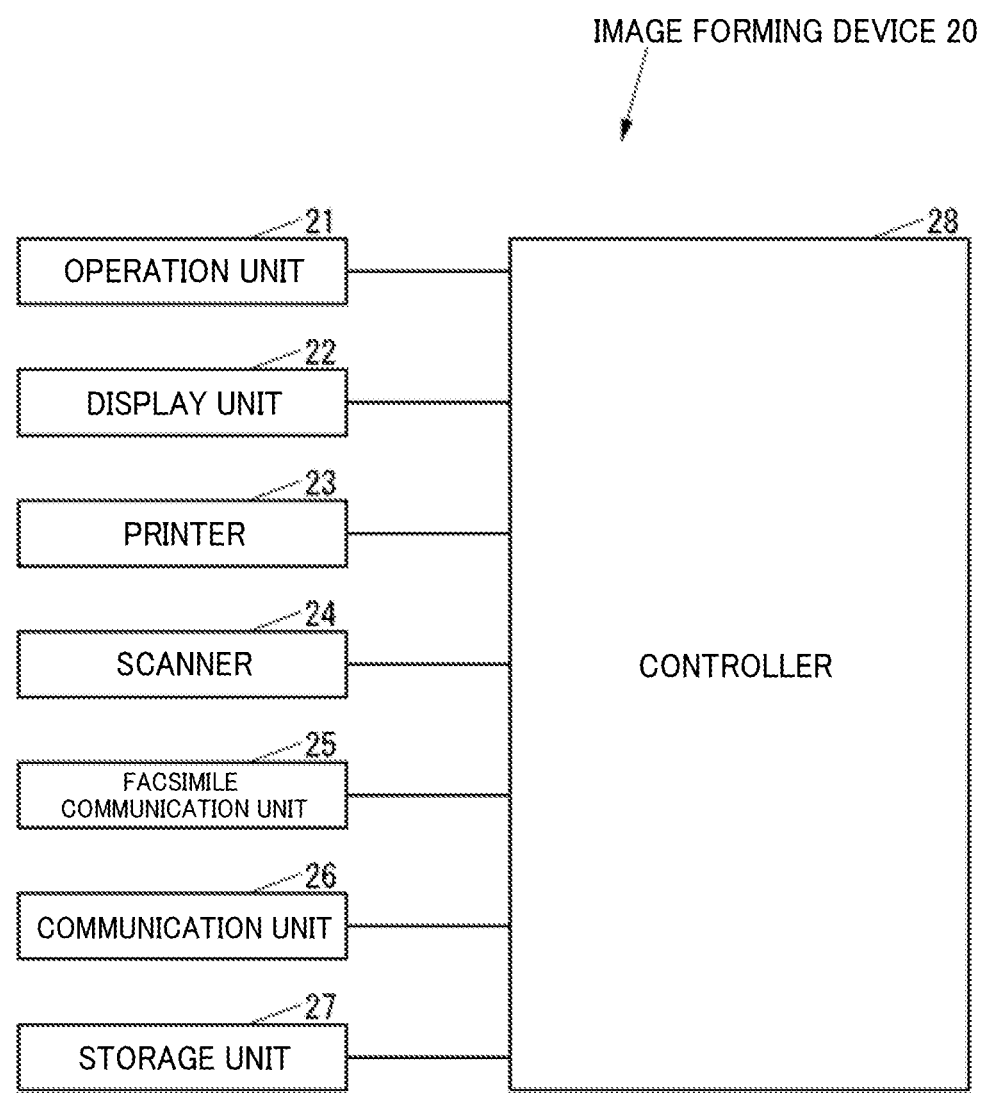
FIG. 2 is a block diagram of an image forming device shown in FIG. 1 in the case of a multifunctional peripheral (MFP)

FIG. 2 is a block diagram of the image forming device 20 in the case of the MFP.

As shown in FIG. 2, the image forming device 20 includes an operation unit 21 which is an input device such as a button to which various operations are input, a display unit 22 which is a display device such as a liquid crystal display (LCD) for displaying various kinds of information, and a printer 23 which is a printing device for printing an image on a recording medium such as paper. The image forming device 20 further includes a scanner 24 that is a reading device for reading an image from a document, a facsimile communication unit 25 which is a facsimile device for performing facsimile communication with an external facsimile device not shown via a communication line such as a public telephone line, and a communication unit 26 that is a communication device for communicating with an external device via a network such as a local area network (LAN) or the Internet, or directly by wire or wireless without intervening the network. The image forming device 20 further includes a storage unit 27 which is a nonvolatile storage device such as a semiconductor memory and a hard disk drive (HDD) for storing various kinds of information, and a controller 28 for controlling the entire image forming device 20.

The controller 28 includes, for example, a central process unit (CPU), a read only memory (ROM) storing programs and various types of data, and a random access memory (RAM) serving as a volatile storage device used as a work area for the CPU in the controller 28. The CPU in the controller 28 executes a program stored in the storage unit 27 or the ROM in the controller 28.

Figure 3:
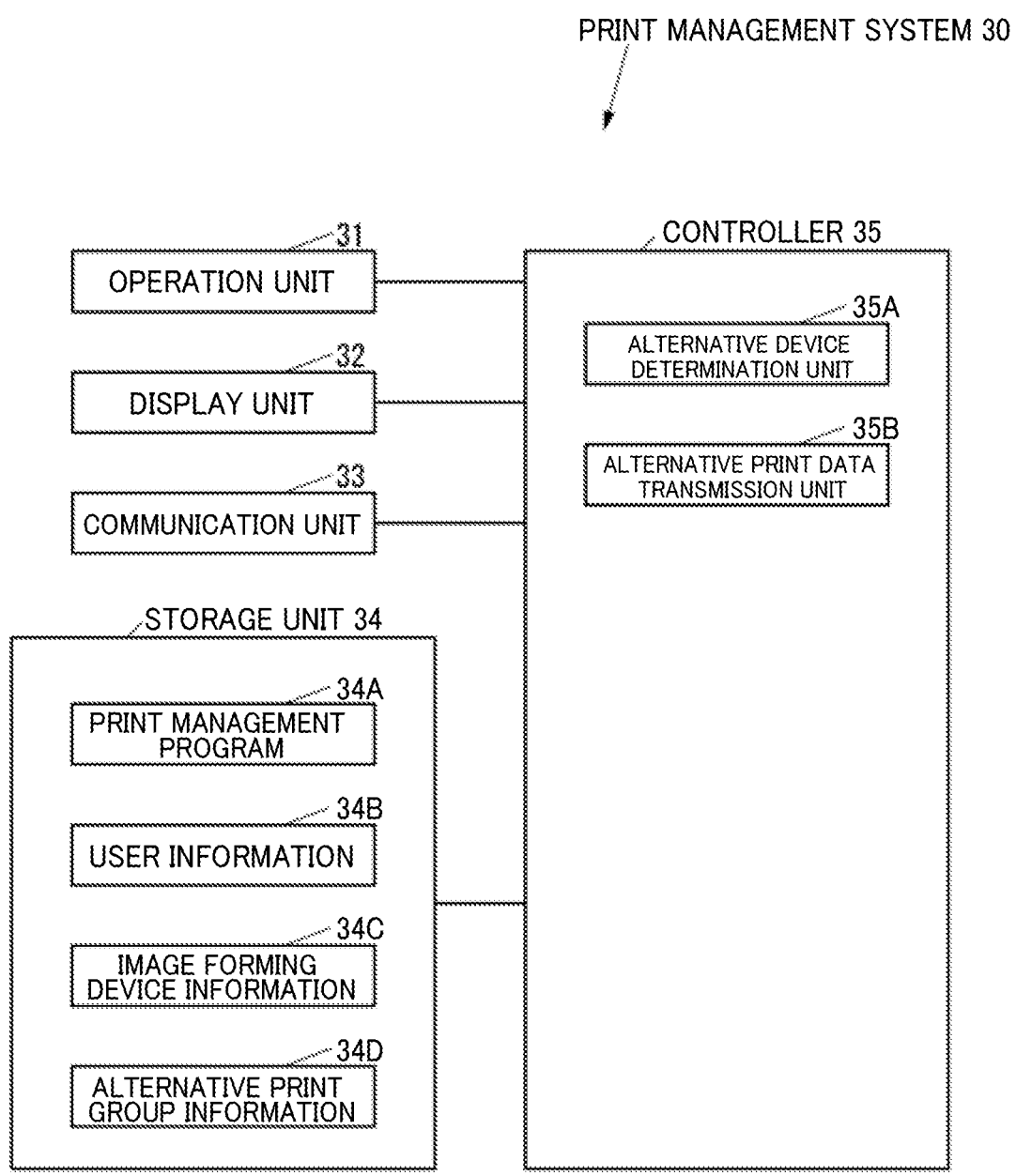
FIG. 3 is a block diagram of a print management system shown in FIG. 1, which is configured by one computer.

FIG. 3 is a block diagram of the print management system 30, which is configured by one computer.

As shown in FIG. 3, the print management system 30 includes an operation unit 31 which is an operation device such as a keyboard and a mouse to which various operations are input, and a display unit 32 which is a display device such as an LCD for displaying various kinds of information. The print management system 30 further includes a communication unit 33 which is a communication device for communicating with an external device via a network such as a LAN or the Internet or directly via wire or wireless without intervening the network. The print management system 30 further includes a storage unit 34 which is a nonvolatile storage device such as a semiconductor memory and an HDD for storing various kinds of information, and a controller 35 for controlling the entire print management system 30.

The storage unit 34 stores a print management program 34a for managing printing based on the image forming device. The print management program 34a may be installed in the print management system 30 at the stage of manufacturing the print management system 30, additionally installed in the print management system 30 from an external storage medium such as a compact disk (CD), a digital versatile disk (DVD) and a universal serial bus (USB) memory, or additionally installed in the print management system 30 from a network, for example.

The storage unit 34 stores user information 34b indicating various information of a user.

Figure 4:
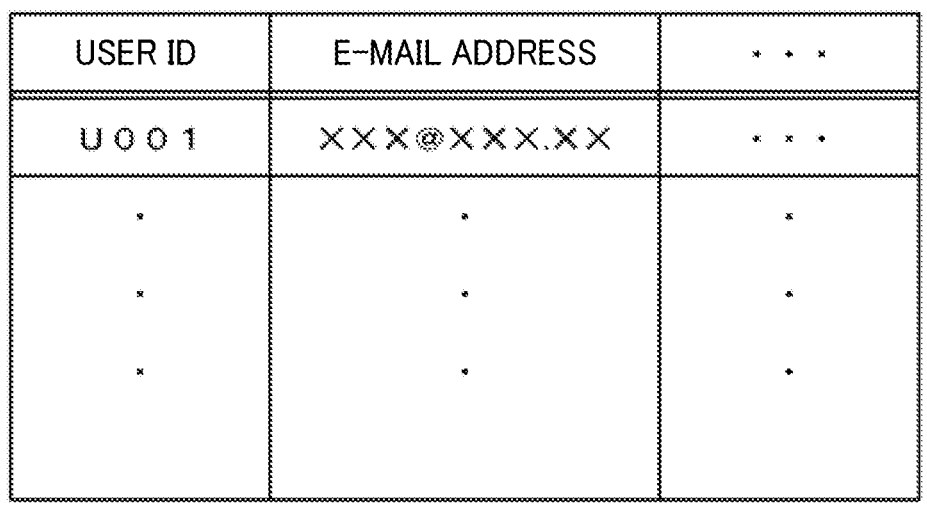
FIG. 4 is a diagram showing an example of user information shown in FIG. 3.

FIG. 4 is a diagram showing an example of the user information 34b.

As shown in FIG. 4, the user information 34b includes user identification information (hereinafter referred to as "user ID") and various information such as a user's e-mail address associated with the user ID. Here, the e-mail address may be, for example, information capable of receiving an e-mail by a mobile terminal such as a smartphone carried by a user.

As shown in FIG. 3, the storage unit 34 stores image forming device information 34c indicating various information of the image forming device.

FIG. 5 is a diagram showing an example of the image forming device information 34c.

As shown in FIG. 5, the image forming device information 34c includes identification information of the image forming device (hereinafter, referred to as "device ID"), and various information such as the printing speed and the installation location of the image forming device associated with the device ID.

As shown in FIG. 3, the storage unit 34 stores alternative print group information 34d indicating a group of image forming devices that can execute alternative printing.

FIG. 6 is a diagram showing an example of the alternative print group information 34d.

As shown in FIG. 6, the alternative print group information 34d includes identification information of a group of image forming devices capable of executing alternative printing (hereinafter, referred to as "group ID") and the device ID of image forming devices belonging to the group associated with the group ID.

The controller 35 shown in FIG. 3 includes, for example, a CPU, a ROM storing programs and various data, and a RAM serving as a work area for the CPU in the controller 35. The CPU in the controller 35 executes a program stored in the storage unit 34 or the ROM in the controller 35.

The controller 35 executes the print management program 34a, to realize an alternative device determination unit 35a that determines an alternative device as an image forming device which is alternative to the image forming device when the alternative printing is requested from the image forming device, and an alternative print data transmission unit 35b that transmits print data for alternative printing (hereinafter, referred to as "alternate print data") to the alternative device determined by the alternative device determination unit 35a.

Next, the operation of the alternative print system 10 will be described.

First, the operation of the image forming device 20 when receiving print data will be described.

A user can transmit print data to the image forming device 20 from a computer such as a personal computer (PC). The print data includes the user ID of the sender of the print data. When the controller 28 in the image forming device 20 receives print data, the controller 28 executes the operation shown in FIG. 7.

Figure 7:
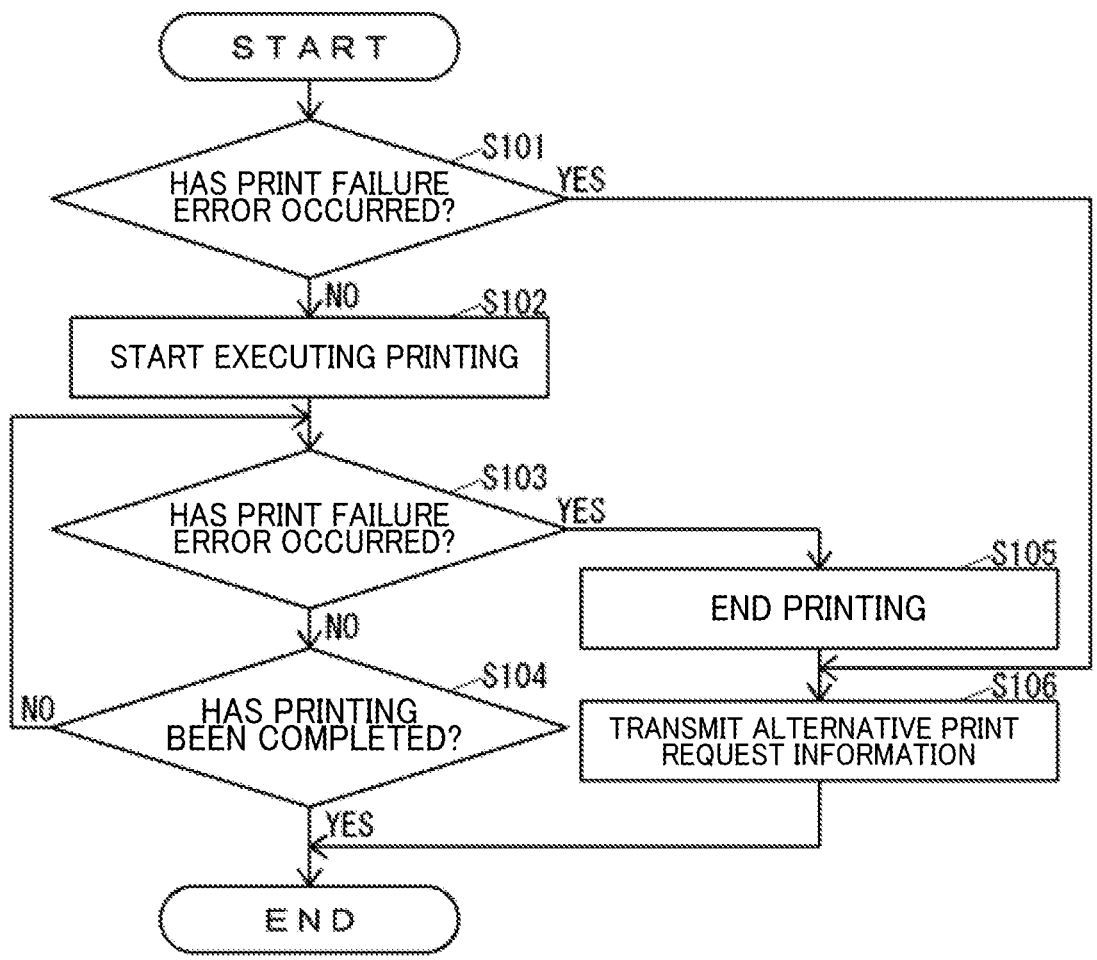
FIG. 7 is a flowchart of the operation of the image forming device shown in FIG. 2 when receiving print data.

FIG. 7 is a flowchart of the operation of the image forming device 20 when receiving print data.

As shown in FIG. 7, the controller 28 in the image forming device 20 determines whether an error making printing impossible (hereinafter, referred to as "print failure error") has occurred (S101).

When the controller 28 determines in S101 that the print failure error has not occurred, the controller 28 starts executing printing based on the received print data, that is, the target print data (S102).

Then, the controller 28 determines whether the print failure error has occurred (S103).

When the controller 28 determines in S103 that the print failure error has not occurred, the controller 28 determines whether the printing started in S102 has been completed (S104).

When the controller 28 determines in S104 that the printing has not been completed, the controller 28 executes the processing of S103.

When the controller 28 determines in S104 that the printing has been completed, the controller 28 ends the operation shown in FIG. 7.

When the controller 28 determines in S103 that the print failure error has occurred, the controller 28 ends the printing started in S102 (S105).

When the controller 28 determines in step S101 that the print failure error has occurred or ends the processing in step S105, the controller 28 transmits alternative print request information for requesting an alternative print to the print management system 30 (S106), and then ends the operation shown in FIG. 7. Here, the controller 28 incorporates the device ID of the image forming device 20, the target print data, a page range that has not been printed among pages based on the target print data (hereinafter referred to as "unprinted page range"), and the user ID of the sender of the target print data into the alternative print request information in S106.

Although the operation of the image forming device 20 has been described above, the same is applied to an image forming device other than the image forming device 20.

Next, the operation of the print management system 30 when receiving alternative print request information will be described.

Figure 8:
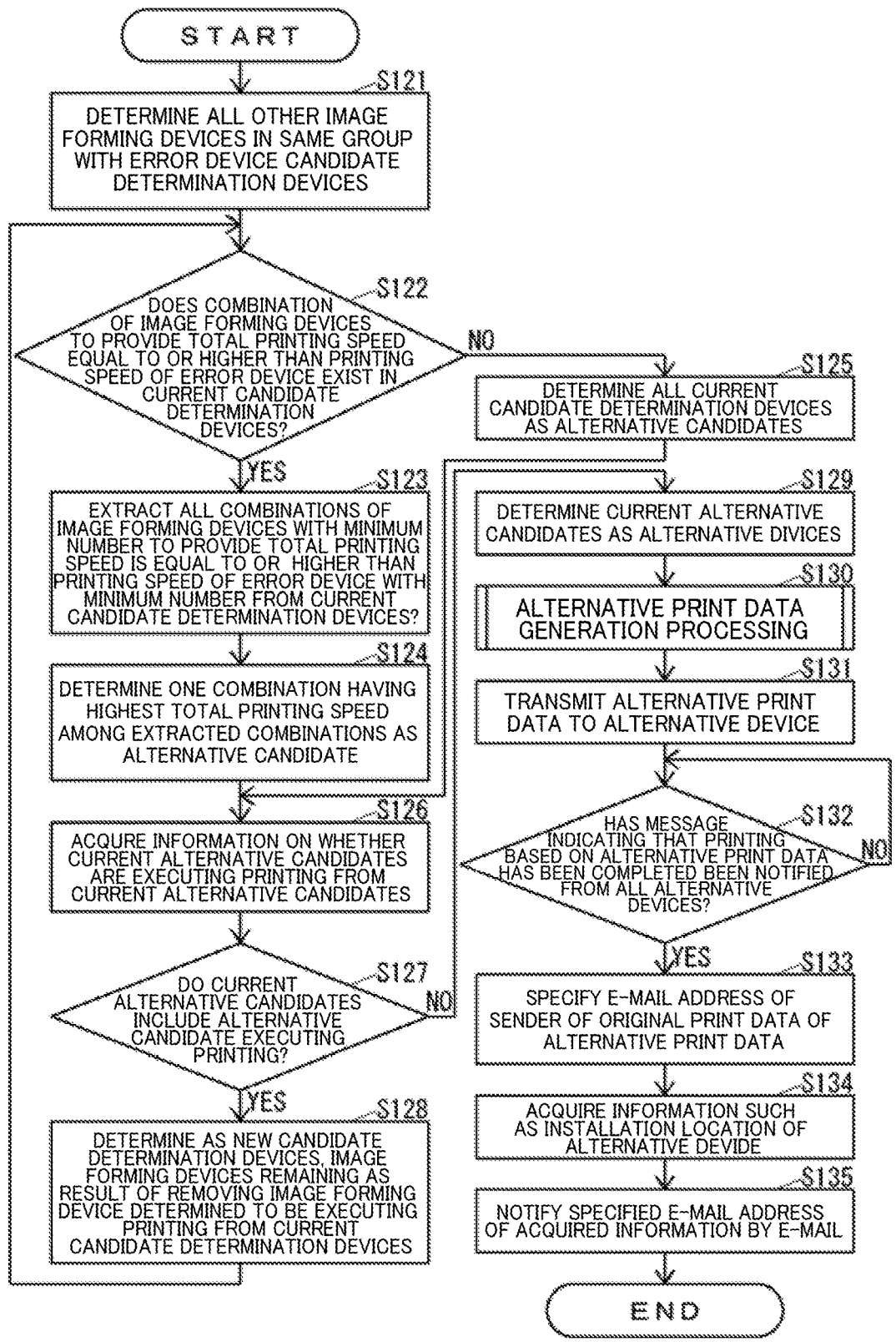
FIG. 8 is a flowchart of the operation of the print management system shown in FIG. 3 when receiving alternative print request information.

When the controller 35 in the print management system 30 receives alternative print request information, the controller 35 executes the operation shown in FIG. 8.

FIG. 8 is a flowchart of the operation of the print management system 30 when receiving alternative print request information.

As shown in FIG. 8, the alternative device determination unit 35a in the print management system 30 determines all other image forming devices (Hereinafter "candidate determination devices") included in the same group with the image forming device that has transmitted the alternative print request information (Hereinafter referred to as "error device") as an image forming device for determining an alternative device candidate for the error device (Hereinafter referred to as "alternative candidate"), based on the device ID included in the alternative print request information and the alternative print group information 34d (S121). For example, when the device ID of the error device is "D011" and the alternative print group information 34d is as shown in FIG. 6, the alternative device determination unit 35a determines the image forming devices shown in FIG. 9 as the candidate determination devices in S121.

As shown in FIG. 8, after the processing of S121, the alternative device determination unit 35a determines whether the combination of image forming devices to provide total printing speed equal to or higher than the printing speed of the error device exists in the current candidate determination devices (S122).

When the alternative device determination unit 35a determines in S122 that the combination of the image forming devices to provide the total printing speed equal to or higher than the printing speed of the error device exists in the current candidate determination devices, the alternative device determination unit 35a extracts all combinations of image forming devices to provide the total printing speed equal to or higher than the printing speed of the error device with the minimum number of the image forming devices from the current candidate determination devices (S123). For example, when the device ID of the error device is "D011", the image forming device information 34c is as shown in FIG. 5, and the current candidate determination devices are the devices shown in FIG. 9, the alternative device determination unit 35a extracts the image forming device with the device ID "D004", the image forming device with the device ID "D005", the image forming device with device ID "D009", and the image forming device with the device ID "D010" in S123, as the respective combination of image forming devices in which the total printing speed is equal to or higher than the printing speed of the error device with the minimum number, since the printing speed of the error device is sixty (60) sheets/minute.

After the processing of S123, the alternative device determination unit 35a determines one combination having the highest total printing speed among the combinations extracted in S123 as the alternative candidate (S124). For example, when the alternative device determination unit 35a extracts the image forming device with the device ID "D004", the image forming device with the device ID "D005", the image forming device with the device ID "D009", and the image forming device with the device ID "D010" in S123, the alternative device determination unit 35a determines the image forming device with the device ID "D010" having the highest printing speed among the extracted image forming devices in S124.

When the alternative device determination unit 35a determines in S122 that the combination of image forming devices whose total printing speed is equal to or higher than the printing speed of the error device does not exist in the current candidate determination devices, the alternative device determination unit 35a determines all of the current candidate determination devices as the alternative candidates (S125).

After the processing in S124 or S125, the alternative device determination unit 35a acquires information on whether the current alternative candidates are executing printing from the current alternative candidates themselves (S126).

Then, the alternative device determination unit 35a determines whether the current alternative candidates include an alternative candidate which is executing printing, based on the information acquired in S126 (S127).

When the alternative device determination unit 35a determines in S127 that the current alternative candidates include an alternative candidate which is executing printing, the alternative device determination unit 35a determines, as new candidate determination devices, the image forming devices remaining as a result of removing the image forming device which is executing printing determined in S127 from the current candidate determination devices (S128), and then executes the processing of S122.

When the alternative device determination unit 35a determines in S127 that the current alternative candidates include no alternative candidate which is executing printing, the alternative device determination unit 35a determines the current alternative candidates as the alternative devices (S129).

When the processing of S129 is completed, the alternative print data transmission unit 35b executes alternative print data generation processing which generates alternative print data to be transmitted to each of the alternative devices determined in S129 (S130).

Figure 10:
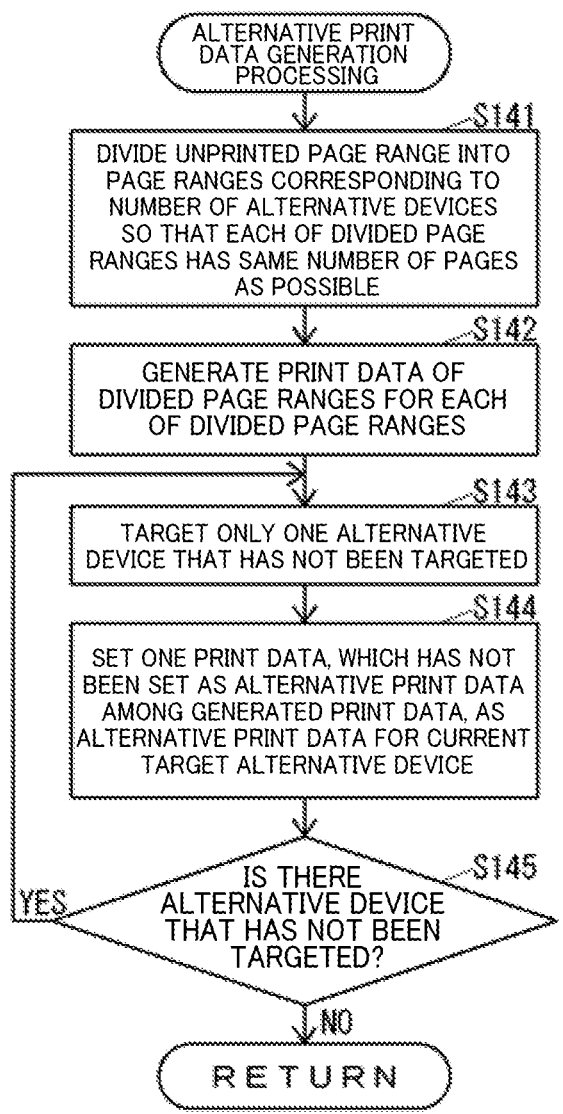
FIG. 10 is a diagram showing an example of alternative print data generation processing shown in FIG. 8.

FIG. 10 is a diagram showing an example of the alternative print data generation processing shown in FIG. 8.

As shown in FIG. 10, the alternative print data transmission unit 35b divides the unprinted page range included in the alternative print request information into page ranges corresponding to the number of the alternative devices, so that each of the divided page ranges has the same number of pages as possible (S141). For example, when the number of pages in the unprinted page range is six hundred (600) and the number of the alternative devices is two (2), the alternative print data transmission unit 35b divides the unprinted page range into two divided page ranges each having three hundred (300) pages.

After the processing of S141, the alternative print data transmission unit 35b generates print data of the divided page ranges divided in S141 for each of the page ranges divided in S141, based on the print data included in the alternative print request information and the page ranges divided in S141 (S142).

Then, the alternative print data transmission unit 35b targets only one alternative device that has not been targeted in the operation shown in FIG. 10 (S143).

Then, the alternative print data transmission unit 35b sets one print data, which is not the alternative print data among the print data generated in S142, as the alternative print data for the current target alternative device (S144).

Then, the alternative print data transmission unit 35b determines whether there is an alternative device that has not been targeted in the operation shown in FIG. 10 (S145).

When the alternative print data transmission unit 35b determines in S145 that there is an alternative device that has not been targeted in the operation shown in FIG. 10, the alternative print data transmission unit 35b executes the processing of S143.

When the alternative print data transmission unit 35b determines in S145 that there is no alternative device that has not been targeted in the operation shown in FIG. 10, the alternative print data transmission unit 35b ends the operation shown in FIG. 10.

As shown in FIG. 8, after the processing of S130, the alternative print data transmission unit 35b transmits the alternative print data generated in S130 to the alternative device (S131). The controller in the image forming device that has received the alternative print data starts printing based on the received alternative print data. Then, when the controller in the image forming device completes to print based on the alternative print data, the controller notifies the print management system 30 that the printing based on the alternative print data has been completed.

After the processing of S131, the alternative print data transmission unit 35b in the print management system 30 determines whether the message indicating that the printing based on the alternative print data has been completed has been notified from all the alternative devices until the alternative print data transmission unit 35b determines that the message indicating that the printing based on the alternative print data has been completed has been notified from all the alternative devices (S132).

When the alternative print data transmission unit 35b determines in S132 that the message indicating that the printing based on the alternative print data has been completed has been notified from all the alternative devices, the alternative print data transmission unit 35b specifies the e-mail address of the sender of the original print data of the alternative print data based on the user ID included in the alternative print request information and the user information 34b (S133).

Then, the alternative print data transmission unit 35b acquires information such as the installation location of the alternative device based on the device ID of the alternative device and the image forming device information 34c (S134).

Then, the alternative print data transmission unit 35b notifies the e-mail address specified in S133 of the information acquired in S134 by e-mail (S135), and then ends the operation shown in FIG. 8.

As explained above, the alternative print system 10 determines, as the alternative devices, all image forming devices which are included in one of the combinations of the image forming devices which have the total printing speed equal to or higher than the printing speed of the image forming device requested the alternative print to the print management system 30 with the minimum number of image forming devices (S123 and S129). Therefore, the alternative print system 10 can reduce the number of the alternative devices and reduce the possibility of occurrence of a delay based on executing and completing the alternative print.

Note that the image forming devices included in the alternative print system 10 are shared by many users. Therefore, it is very effective that the number of the alternative devices can be reduced in the alternative print system 10.

The alternative print system 10 determines all image forming devices included in one of the combinations having the highest total printing speed as the alternative devices (S124 and S129). Therefore, in executing the alternative print, the alternative print system 10 can advance the timing of completing the alternative print. As a result, it is possible to reduce the possibility of occurrence of the delay based on executing and completing the alternative print.

The alternative print system 10 determines all image forming devices included in one of the combinations that do not include image forming device that is executing printing as the alternative devices (NO in S127 and S129). The alternative print system 10 can prevent an image forming device which is executing printing, that is, which immediately cannot start the alternative print, from executing the alternative print. As a result, it is possible to reduce the possibility of occurrence of the delay based on executing and completing the alternative print.

When the alternative device determination unit 35a determines in S122 that the combination of image forming devices whose total printing speed is equal to or higher than the printing speed of the error device does not exist in the current candidate determination devices, the alternative device determination unit 35a determines all of the current candidate determination devices as the alternative candidates (S125). However, when the alternative device determination unit 35a determines in S122 that the combination of image forming devices whose total printing speed is equal to or higher than the printing speed of the error device does not exist in the current candidate determination devices, the alternative device determination unit 35a may determine image forming devices whose number is equal to or less than a specific upper limit value among the current candidate determination devices as the alternative candidates. Here, the image forming devices determined as the alternative candidates may be image forming devices configured by a number of image forming devices equal to or less than the upper limit value and configured by the combination having the highest total printing speed.

When the alternative device determination unit 35a determines in S122 that the combination of image forming devices whose total printing speed is equal to or higher than the printing speed of the error device does not exist in the current candidate determination devices, the alternative device determination unit 35a determines all of the current candidate determination devices as the alternative candidates (S125). However, when the alternative device determination unit 35a determines in S122 that the combination of image forming devices whose total printing speed is equal to or higher than the printing speed of the error device does not exist in the current candidate determination devices, the alternative device determination unit 35a may end the operation shown in FIG. 8 as an error.

In the operation shown in FIG. 8, the alternative print data transmission unit 35b notifies the user of information such as the installation location of the alternative device by e-mail (S135). However, the alternative print data transmission unit 35b may notify the user of information such as the installation location of the alternative device by communication means other than the e-mail.

In the present embodiment, the alternative print data transmission unit 35b executes the processing shown in FIG. 10 as the alternative print data generation processing. However, the alternative print data transmission unit 35b may execute processing other than the processing shown in FIG. 10, such as the processing shown in FIG. 11, as the alternative print data generation processing.

Figure 11:
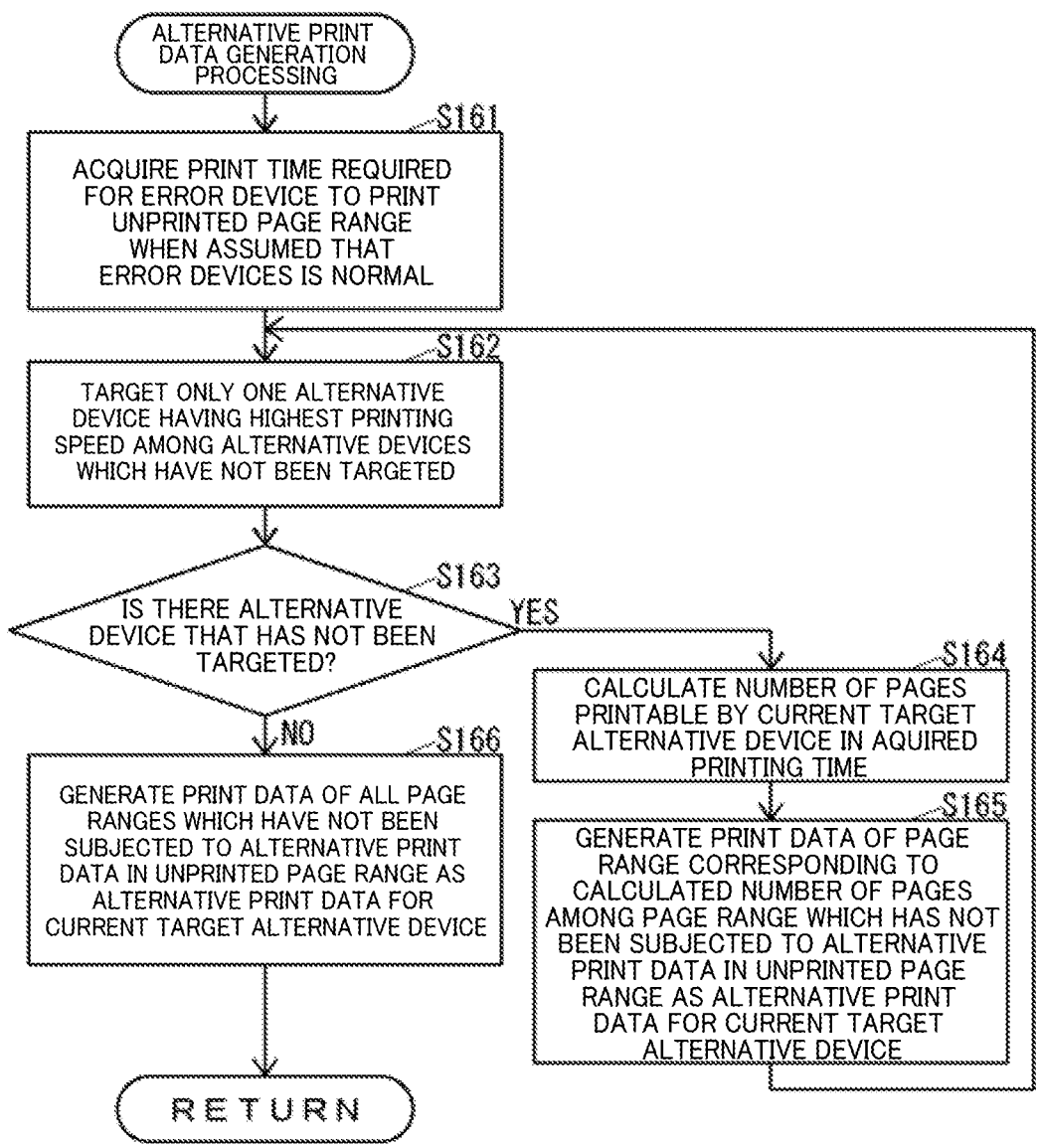
FIG. 11 is a diagram showing an example of the alternative print data generation processing shown in FIG. 8, which is different from the example shown in FIG. 10.

FIG. 11 is a diagram showing an example of the alternative print data generation processing shown in FIG. 8, which is different from the example shown in FIG. 10.

As shown in FIG. 11, when it is assumed that the error device is normal, the alternative print data transmission unit 35b acquires a print time required for the error device to print the unprinted page range included in the alternative print request information, based on the number of the unprinted pages included in the alternative print request information and the printing speed of the error device (S161). For example, when the device ID of the error device is "D011", the image forming device information 34c is as the information shown in FIG. 5, and the number pages of the unprinted number pages included in the alternative print request information is six hundred (600), the alternative print data transmission unit 35b acquires ten (10) minutes as the printing time in S161 since the printing speed of the error device is sixty (60) sheets/minute.

After the processing of S161, the alternative print data transmission unit 35b targets only one alternative device having the highest printing speed among the alternative devices which have not targeted in the operation shown in FIG. 11 (S162). For example, in the case where the image forming device with the device ID "D001" and the image forming device with the device ID "D003" are the alternative devices, and the image forming device information 34c is as shown in FIG. 5, when the image forming device with the device ID "D001" and the image forming device with the device ID "D003" have not been targeted in the operation shown in FIG. 11, the alternative print data transmission unit 35b targets the image forming device with the device ID "D001" in S162.

After the processing of S162, the alternative print data transmission unit 35b determines whether there is an alternative device that has not been targeted in the operation shown in FIG. 11 (S163).

When the alternative print data transmission unit 35b determines in S163 that there is an alternative device which has not targeted in the operation shown in FIG. 11, the alternative print data transmission unit 35b calculates the number of pages printable by the current target alternative device in the printing time acquired in S161, based on the printing speed of the current target alternative device and the printing time acquired in S161 (S164). For example, when the device ID of the current target alternative device is "D001", the image forming device information 34c is as shown in FIG. 5, the number pages in the unprinted page range included in the alternative print request information is six hundred (600), and the print time acquired in S161 is ten (10) minutes, the alternative print data transmission unit 35b calculates 400 pages in S164 since the printing speed of the image forming device with the device ID "D001" is forty (40) sheets/min.

After the processing of S164, the alternative print data transmission unit 35b generates print data of the page range corresponding to the number pages calculated in S164 among the page range which has not been subjected to the alternative print data in the unprinted page range included in the alternative print request information, as the alternative print data for the current target alternative device, based on the print data and the unprinted page range included in the alternative print request information (S165), and then executes the processing of S162.

When the alternative print data transmission unit 35b determines in S163 that there is no alternative device which has not been targeted in the operation shown in FIG. 11, the alternative print data transmission unit 35b generates print data of all page ranges which have not been subjected to the alternative print data in the unprinted page range included in the alternative print request information, as the alternative print data for the current target alternative device, based on the print data and the unprinted page range included in the alternative print request information (S166), and then ends the operation shown in FIG. 11.

Second Embodiment

First, the configuration of an alternative print system according to a second embodiment of the present disclosure will be described.

Figure 12:
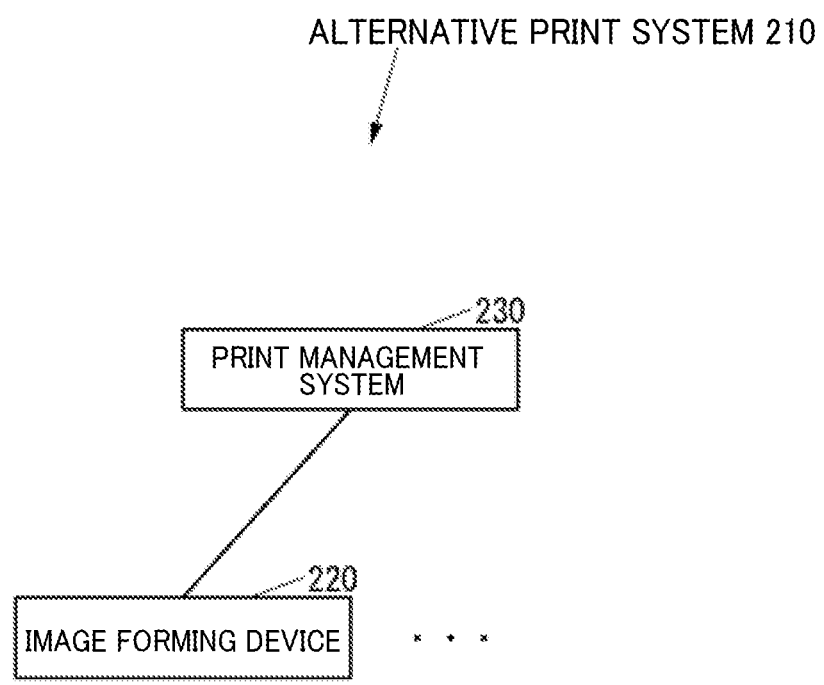
FIG. 12 is a block diagram of an alternative print system according to a second embodiment of the present disclosure.

FIG. 12 is a block diagram of an alternative print system 210 according to the present embodiment.

As shown in FIG. 12, the alternative print system 210 includes an image forming device 220. The alternative print system 210 may include at least one image forming device having the same configuration to that of the image forming device 220, in addition to the image forming device 220.

The alternative print system 210 includes a print management system 230 for managing printing by the image forming device.

Figure 13:
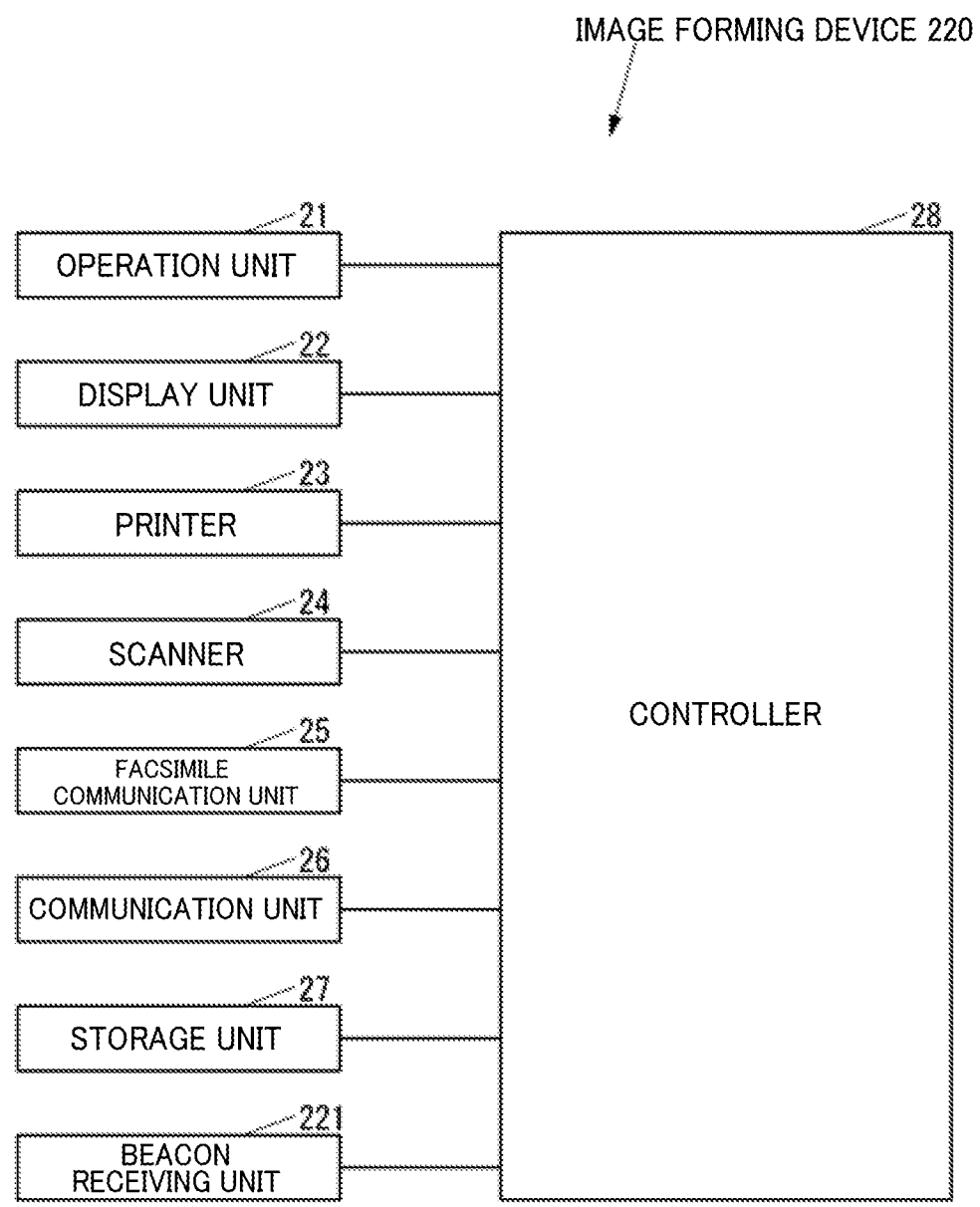
FIG. 13 is a block diagram of an image forming device shown in FIG. 12 in the case of the MFP.

FIG. 13 is a block diagram of the image forming device 220 in the case of the MFP.

As shown in FIG. 13, the configuration of the image forming device 220 is the same as the configuration of the image forming device 20 (see FIG. 2) according to the first embodiment, but it also includes a beacon receiving unit 221 for receiving data from a beacon.

Figure 14:
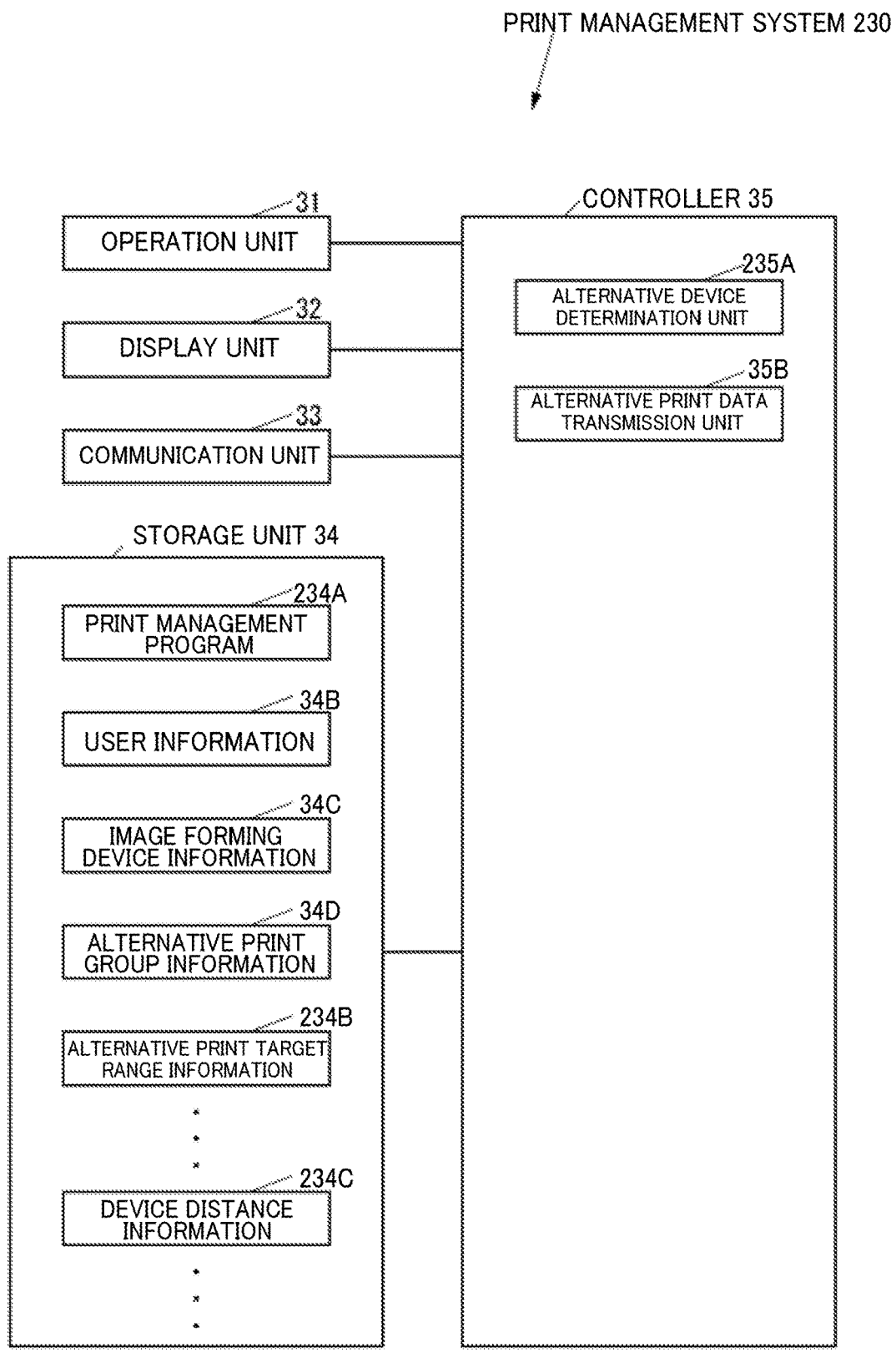
FIG. 14 is a block diagram of a print management system shown in FIG. 12, which is configured by one computer.

FIG. 14 is a block diagram of the print management system 230 which is configured by one computer.

As shown in FIG. 14, the configuration of the print management system 230 is the same as the configuration such that the print management system 30 (see FIG. 3) according to the first embodiment stores a print management program 234a for managing printing by the image forming device instead of the print management program 34a (see FIG. 3) in the storage unit 34, alternative print target range information 234b that indicates, by distance, a range for setting the image forming device as alternative print target such as within ten meters (10 m), within twenty meters (20 m), and within thirty meters (30 m), and device distance information 234c indicating the distance from the user to the image forming device.

The print management system 230 can store, in the storage unit 34, alternative print target range information having the same configuration as that of the alternative print target range information 234b. The alternative print target range information in the print management system 230 is stored in the storage unit 34 for each user in association with the user ID. The alternative print target range information can be changed by a user and an administrator who manages the user. In the alternative print target range information, the range in which the image forming device is targeted for the alternative print may be changed by specifying an arbitrary distance, or by selecting an arbitrary option from the options which have been previously prepared.

The print management system 230 can store device distance information having the same configuration as that of the device distance information 234c in the storage unit 34. The device distance information in the print management system 230 is stored in the storage unit 34 for each user in association with the user ID.

FIG. 15 is a diagram showing an example of the device distance information 234c.

As shown in FIG. 15, the device distance information 234c includes a device ID of an image forming device existing near the user, and a distance from the image forming device to the user so that the device ID is associated with the distance.

The controller 35 shown in FIG. 14 executes the print management program 234a to realize an alternative device determination unit 235a that determines an alternative device of the image forming device when an alternative print is requested from the image forming device, and an alternative print data transmission unit 35b that transmits alternative print data to the alternative device determined by the alternative device determination unit 235a.

Next, the operation of the alternative print system 210 will be described.

The operation of the alternative print system 210 is the same as the operation of the alternative print system 10, except for the points described below.

First, the operation of the print management system 230 when updating the device distance information will be described.

The user carries a portable terminal such as a smartphone that can transmit data from a beacon including the user ID of the user. When the controller in the image forming device receives data from a beacon transmitted from the user's mobile terminal by the beacon receiving unit, the controller in the image forming device obtains the distance to the user's mobile terminal based on the beacon, that is, the distance to the user, and transmits distance notification information including the obtained distance, the user ID included in the beacon, and the device ID of the image forming device to the alternative print system 210.

Figure 16:
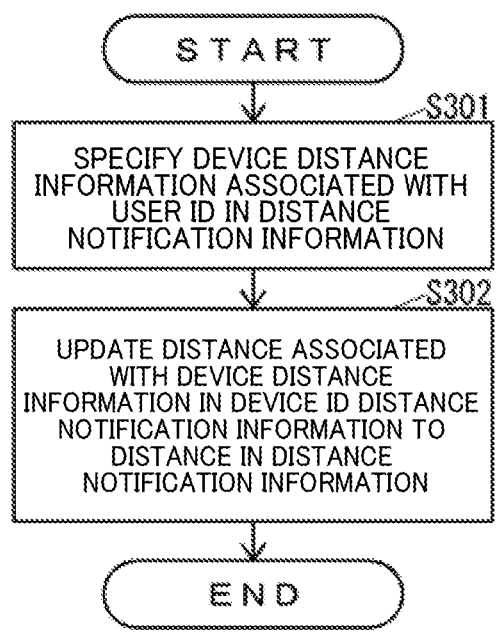
FIG. 16 is a diagram showing the operation of the print management system shown in FIG. 14 when updating the device distance information.

When the alternative device determination unit 235a in the print management system 230 receives the distance notification information from the image forming device, the alternative device determination unit 235a executes the operation shown in FIG. 16.

FIG. 16 shows the operation of the print management system 230 when updating the device distance information.

As shown in FIG. 16, the alternative device determination unit 235a specifies the device distance information associated with the user ID included in the distance notification information received from the image forming device (S301).

Then, the alternative device determination unit 235a updates the distance associated with the device distance information, which is specified in S301 in the device ID included in the distance notification information received from the image forming device, to the distance included in the distance notification information received from the image forming device (S302), and then ends the operation shown in FIG. 16.

As described above, the device distance information is always maintained in the latest state.

Next, the operation of the print management system 230 when receiving alternative print request information will be described.

Figure 17:
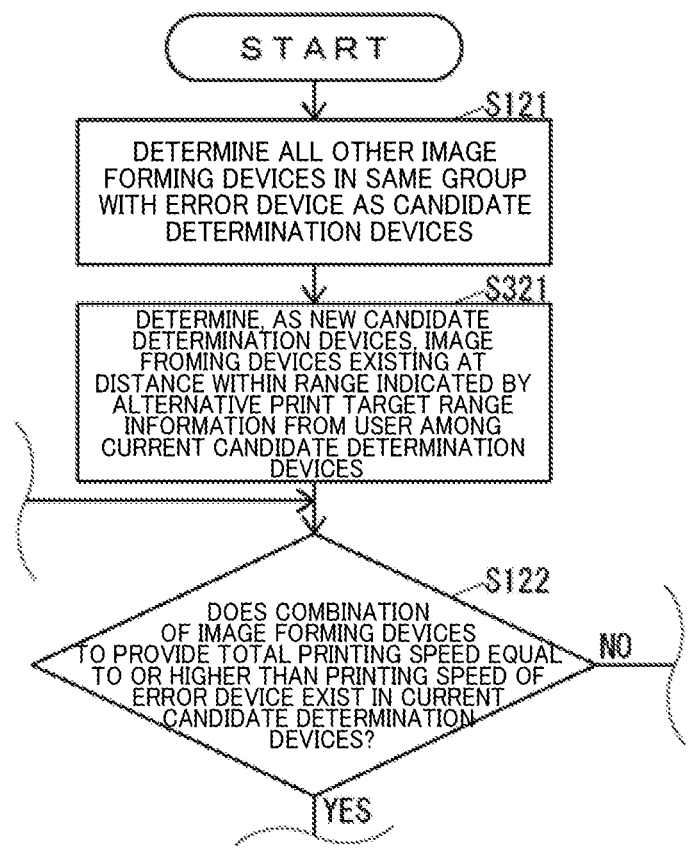
FIG. 17 is a flowchart showing a part of the operation of the print management system shown in FIG. 14 when receiving alternative print request information.

When the controller 35 in the print management system 230 receives alternative print request information, the controller 35 executes the operation shown in FIG. 17.

FIG. 17 is a flowchart of a part of the operation of the print management system 230 when receiving alternative print request information.

As shown in FIG. 17, the alternative device determination unit 235a in the print management system 230 executes the processing of S121 in the same manner as the operation shown in FIG. 8.

Then, the alternative device determination unit 235a determines, as new candidate determination devices, image forming devices existing at a distance within the range indicated by the alternative print target range information from the user among the current candidate determination devices, based on the current candidate determination devices, and the alternative print target range information and the device distance information associated with the user ID included in the alternative print request information (S321). For example, when the current candidate determination devices are as shown in FIG. 9, the device distance information is as shown in FIG. 15, and the range indicated in the alternative print target range information is "within ten meters (10 m)", the alternative device determination unit 235a determines the image forming devices shown in FIG. 18 as the candidate determination devices in S321. Also, when the current candidate determination devices are as shown in FIG. 9, the device distance information is as shown in FIG. 15, and the range indicated in the alternative print target range information is "within twenty meters (20 m)", the alternative device determination unit 235a determines the image forming devices shown in FIG. 19 as the candidate determination devices in S321. Also, when the current candidate determination devices are as shown in FIG. 9, the device distance information is as shown in FIG. 15, and the range indicated in the alternative print target range information is "within thirty meters (30 m)", the alternative device determination unit 235a determines the image forming devices shown in FIG. 9 as the candidate determination devices in S321.

After the processing of S321, the alternative device determination unit 235a executes the processing of S122 to S129 in the same manner as the operation shown in FIG. 8. Further, the alternative print data transmission unit 35b executes the processing of S130 to S135 in the same manner as the operation shown in FIG. 8.

Figure 18:
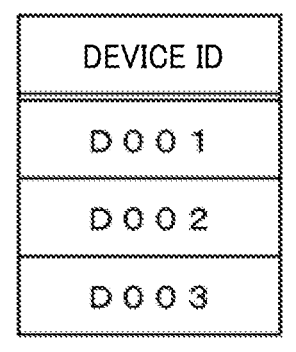

For example, when the device ID of the error device is "D011", the image forming device information 34c is as shown in FIG. 5, and the current candidate determination devices are the devices shown in FIG. 18, the alternative device determination unit 235a extracts the combination of the image forming device with the device ID "D001" and the image forming device with the device ID "D002", and the combination of the image forming device with the device ID "D001" and the image forming device with the device ID "D003", respectively, as the combination of image forming devices whose total printing speed is equal to or higher than the printing speed of the error device with the minimum number in S123, since the printing speed of the error device is sixty (60) sheets/minute. Subsequently, the alternative device determination unit 235a determines the combination of the image forming device with the device ID "D001" and the image forming device with the device ID "D002" having the highest total printing speed among the combinations in S124.

Figure 19:
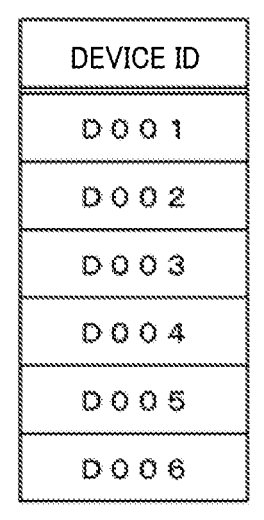

Further, the device ID of the error device is "D011", the image forming device information 34c is as shown in FIG. 5, and the current candidate determination devices are the devices shown in FIG. 19, the alternative device determination unit 235a extracts the image forming device with the device ID "D004" and the image forming device with the device ID "D005", respectively as the combination of image forming devices whose total printing speed is equal to or higher than the printing speed of the error device with the minimum number in S123, since the printing speed of the error device is sixty (60) sheets/min. Subsequently, the alternative device determination unit 235a determines the image forming device with the device ID "D004" having the highest printing speed among the devices in S124.

As explained above, the alternative print system 210 determines all image forming devices included in one of the combinations configured by only the image forming devices existing within a specific range from the sender of the print data as the alternative devices (S321 and S129). Therefore, the alternative print system 210 can prevent the image forming device located at a position relatively far from the sender of the print data from executing the alternative print. As a result, the alternative print system 210 can reduce the possibility that the time required for the sender of the print data to obtain the printed material becomes longer.

The alternative print system 210 acquires the distance between the sender of the print data and the image forming device by using the data from the beacon transmitted by the portable terminal carried by the sender of the print data in the present embodiment. However, the alternative print system 210 may acquire the distance between the sender of the print data and the image forming device by a method other than the method using the data from the beacon transmitted by the mobile terminal carried by the sender of the print data.

What is claimed is:
1. An alternative print system, comprising:
a plurality of image forming devices; and
a print management system configured to manage printing by the plurality of image forming devices,
wherein in case where an error making printing impossible occurs when print data is received by an image forming device out of the plurality of image forming devices, the image forming device requests to the print management system an alternative print as printing by an alternative device as an alternative image forming device of the image forming device itself,
wherein the print management system includes a processor that:
    determines the alternative device when the alternative print is requested from the image forming device; and
    transmits print data for the alternative print to the alternative device determined by the processor, and
wherein the processor extracts, from the plurality of image forming devices other than the image forming device which requests the alternative print to the print management system, combinations of the image forming devices, each of which is a combination of the image forming devices the number of which is minimum to provide a total printing speed equal or higher than printing speed of the image forming device which requests the alternative print to the print management system, and determines, as the alternative device, all of the image forming devices of one of the extracted combinations.

2. The alternative print system according to claim 1, wherein the one of extracted combinations provides the total printing speed being fastest.

3. The alternative print system according to claim 1, wherein the one of extracted combinations does not include the image forming device which is executing printing.

4. The alternative print system according to claim 1, wherein the image forming devices which provide the total printing speed equal or higher than printing speed of the image forming device which requests the alternative print to the print management system include the image forming device which exists with a specific range from a sender of the print data.

5. The alternative print system according to claim 1, wherein the image forming devices which provide the total printing speed equal or higher than printing speed of the image forming device which requests the alternative print to the print management system are the image forming device which belong to a group to which the image forming device which requests the alternative print to the print management system belongs.

6. A print management system, comprising:
a processor that:
    determines an alternative device when an alternative print as printing by the alternative device as an alternative image forming device of an image forming device itself is requested from the image forming device; and
    transmits print data for the alternative print to the alternative device determined by the processor,
wherein the processor extracts, from the plurality of image forming devices other than the image forming device which requests the alternative print to the print management system, combinations of the image forming devices, each of which is a combination of the image forming devices which provide a total printing speed equal or higher than printing speed of the image forming device which requests the alternative print to the print management system and the number of which is minimum, and determines, as the alternative device, all of the image forming devices of one of the extracted combinations.

7. A non-transitory computer-readable recording medium storing a print management program executable by a processor in an image forming device, the print management program causing the processor to execute:

determining an alternative device when an alternative print as printing by the alternative device as an alternative image forming device of the image forming device itself is requested from the image forming device; and transmitting print data for the alternative print to the alternative device, wherein determining the alternative device comprises:

extracting, from the plurality of image forming devices other than the image forming device which requests the alternative print to the computer, combinations of the image forming devices, each of which is a combination of the image forming devices which provide a total printing speed equal or higher than printing speed of the image forming device which requests the alternative print to the computer and the number of which is minimum; and determining, as the alternative device, all of the image forming devices of one of the extracted combinations.

* * * * *